(12) United States Patent
Mitelman et al.

(10) Patent No.: US 9,360,558 B2
(45) Date of Patent: Jun. 7, 2016

(54) GNSS RECEIVER DESIGN TESTING

(76) Inventors: Alexander Mitelman, Hilton Head, SC (US); Robin Hakanson, Cedar Rapids, IA (US); David Karlsson, Lulea (SE); Fredrik Lindstrom, Stockholm (SE); Thomas Renstrom, Johanneshov (SE); Christian Stahlberg, Sollentuna (SE); James Burgess Tidd, Vallingby (SE)

( * ) Notice: Subject to any disclaimer, the term of this patent is extended or adjusted under 35 U.S.C. 154(b) by 970 days.

(21) Appl. No.: 13/255,865

(22) PCT Filed: Sep. 24, 2009

(86) PCT No.: PCT/EP2009/062380
§ 371 (c)(1),
(2), (4) Date: Mar. 20, 2012

(87) PCT Pub. No.: WO2010/102681
PCT Pub. Date: Sep. 16, 2010

(65) Prior Publication Data
US 2012/0169536 A1    Jul. 5, 2012

Related U.S. Application Data

(60) Provisional application No. 61/160,000, filed on Mar. 13, 2009.

(51) Int. Cl.
*G01S 19/23* (2010.01)
*H04B 17/27* (2015.01)
(Continued)

(52) U.S. Cl.
CPC .............. *G01S 19/23* (2013.01); *H04B 17/27* (2015.01); *G01S 19/13* (2013.01); *G01S 19/26* (2013.01); *H04B 17/0072* (2013.01)

(58) Field of Classification Search
CPC .................................. G01S 19/23; H04B 17/27
USPC ............. 342/357.62, 357.24, 357.75, 357.51, 342/357.3
See application file for complete search history.

(56) References Cited

U.S. PATENT DOCUMENTS

| 5,610,614 A | * | 3/1997 | Talbot et al. | 342/352 |
| 5,922,041 A | * | 7/1999 | Anderson | 701/468 |

(Continued)

FOREIGN PATENT DOCUMENTS

| DE | 10110136 A1 | 9/2002 |
| WO | WO2008/141320 A1 | 11/2008 |

OTHER PUBLICATIONS

Chiou, GPS Receiver Performance Using Inertial-Aided Carrier Tracking Loop, Sep. 13-16, 2005, ION GNSS 18th International Techincal Meeting of the Satellite Division.*

(Continued)

*Primary Examiner* — Frank J McGue

(57) ABSTRACT

A GNSS receiver design is tested, which design includes software for generating position/time related data (DPT) based on raw digital data (dRAW) when the software is executed in a processing unit of the receiver. GNSS signals (SRF) are received via a radio frequency input device while moving the radio frequency input device along a route trajectory. The received GNSS signals (SRF) are fed to a radio-frequency front end of a Representative example of a receiver unit built according to the design to be tested. The radio-frequency front end produces raw digital data (dRAW) representing the received GNSS signals (SRF), and the raw digital data (dRAW) are stored in a primary data storage as a source file (Fsc). The source file (Fsc) is read from the primary data storage, and the source file (Fsc) is processed by means of the software to generate at least one set of position/time related data (DPT). Each set of position/time related data (DPT) is stored to a respective result file (Fres), and the result file(s) (Fres) is/are evaluated against reference data (Dref) to determine the performance of the design.

20 Claims, 2 Drawing Sheets

(51) Int. Cl.
*G01S 19/41* (2010.01)
*G01S 19/35* (2010.01)
*G01S 19/13* (2010.01)
*G01S 19/47* (2010.01)
*H04B 17/00* (2015.01)
*G01S 19/26* (2010.01)

(56) References Cited

U.S. PATENT DOCUMENTS 5,999,878 A    12/1999  Hanson et al.
6,114,989 A *   9/2000  Fontes et al. ............. 342/357.57
6,208,289 B1    3/2001  Haendel
7,797,132 B1 *  9/2010  Lele et al. ..................... 702/182
2003/0148761 A1 *  8/2003  Gaal ............................. 455/423
2009/0070038 A1 *  3/2009  Geelen et al. ................. 701/216

OTHER PUBLICATIONS

International Preliminary Report on Patentability for PCT/EP2009/062380 dated Sep. 22, 2011.

International Search Report for PCT/EP2009/062380 dated Jan. 26, 2010.

* cited by examiner

GNSS RECEIVER DESIGN TESTING

THE BACKGROUND OF THE INVENTION

The present invention relates generally to the evaluation and optimization of software receivers for spread spectrum signals of Global Navigation Satellite Systems (GNSSs). More particularly the invention relates to a system, method, and computer program product for testing a GNSS receiver design.

Many examples of GNSSs exist. Presently, the Global Positioning System (GPS; U.S. Government) is the dominant system; however alternative systems are expected to gain increased importance in the future. So far, the GLObal NAvigation Satellite System (GLONASS; Russian Federation Ministry of Defense) and the Galileo system (the European programme for global navigation services) constitute the major alternative GNSSs. Various systems also exist for enhancing the coverage, the availability and/or the quality of at least one GNSS in a specific region. The Quasi-Zenith Satellite System (QZSS; Advanced Space Business Corporation in Japan), the Wide Area Augmentation System (WAAS; The U.S. Federal Aviation Administration and the Department of Transportation) and the European Geostationary Navigation Overlay Service (EGNOS; a joint project of the European Space Agency, the European Commission and Eurocontrol—the European Organisation for the Safety of Air Navigation) represent examples of such augmentation systems for GPS, and in the latter case GPS and GLONASS.

To ensure good performance and reliability of a GNSS receiver, its design must be tested thoroughly. The traditional way to test the real-world performance of a GNSS receiver is to arrange the receiver in a vehicle (or a portable pack) and drive, walk or by other means move the receiver around an area of interest (typically a challenging environment, such as a so-called urban canyon), record position data, and then plot the trajectory on a map and evaluate the trajectory visually.

A refined version of this strategy may involve employing a so-called GPS/INS (Inertial Navigation System) truth reference. Such a system combines relative positioning measurements from an inertial measurement unit (IMU) with available position data from a high-grade GPS receiver to provide continuous absolute position data in all environments. Specifically, this reference data is highly accurate because precise relative measurements from accelerometers and gyroscopes of the IMU can be used whenever the GPS signals are degraded or unavailable. The GPS/INS is carried or driven along with a RUT (receiver under test), and produces a reference trajectory against which the navigation data generated by the RUT is compared. This enables a quantitative measurement of position accuracy. For example, a two-dimensional error can be calculated at time-aligned points, which in turn may serve as a basis for statistics like mean, 95th percentile, and maximum errors for the duration of the trial.

For completeness, it may be worth mentioning that it is not desirable to replace GNSS receivers on the market with high-grade GPS/INS units to overcome any inaccuracy problems with the GNSS receivers. Namely, a GPS/INS unit of sufficient quality is very bulky and heavy. Such a unit also requires considerable amounts of power, and perhaps most important, costs many orders of magnitude more than a conventional GNSS receiver.

The first traditional method is problematic because it is inherently subjective. Different receivers often have different strong and weak points in their navigation algorithms. It is therefore difficult to decide which design is better over the course of a long trial. Also, an accurate evaluation of a trial generally requires some firsthand knowledge of the test area. Unless relevant maps are available in sufficiently high resolution, it is difficult to tell, for example, how accurate a trajectory along a wooded area might be. The second traditional method is a significant improvement upon the first, since it introduces an objective, quantitative reference against which to evaluate positioning and navigation performance of the proposed receiver design.

However both methods suffer from one fundamental limitation: results are inherently obtainable only in real time (plus evaluation in the lab). Moreover, the scope of test coverage is limited to the number of receivers that can be simultaneously fixed on a test rig. A reasonable number of receivers to test concurrently lies on the order of five to ten. Thus, a test car outfitted with this many receivers will be able to generate five to ten quasi-independent results per outing. If a larger number of receivers is to be tested multiple outings are required. Naturally, this may become cumbersome, expensive and time-consuming. Furthermore, trials run at different times necessarily present different signal conditions to the pool of receivers under test, which makes direct comparisons of receiver quality somewhat less meaningful.

SUMMARY OF THE INVENTION

The object of the present invention is to alleviate the above problems and provide a more efficient solution for evaluating a proposed receiver design.

According to one aspect of the invention, the object is achieved by the arrangement as initially described, wherein the GNSS receiver design to be tested includes software configured to generate position/time related data based on the raw digital data produced when the software is executed in a processing unit. The arrangement further includes at least one test processing unit and assessing means. The at least one test processing unit is configured to read the source file from the primary data storage, process the source file by means of the software to generate at least one set of position/time related data, and store each of the at least one set of position/time related data to a respective result file. The assessing means is configured to evaluate each of the result files against reference data and thus determine the performance of the design to be tested.

This arrangement is advantageous because a single outing can provide the basis for an arbitrarily large number of virtual test drives and/or virtual receivers.

According to one preferred embodiment of this aspect of the invention, the at least one test processing unit is configured to process the source file in at least two processing runs of the software starting at different offsets into the source file. Here, each processing run results in a respective result file. Thus, a large number of different tests can be carried out in an extremely simple and efficient manner, where each test is equivalent to moving a representative example of the receiver unit along a route trajectory and studying the resulting position/time related data. The processing runs may be executed in parallel with one another, in series after one another, or a combination thereof.

According to another preferred embodiment of this aspect of the invention, the arrangement includes an interference generator. The interference generator is configured to add at least one interference signal to the source file before the at least one test processing unit executes a given run of the software in respect of the source file. For instance, the at least one interference signal may include noise that is produced according to a Gaussian noise model, or a filtered version thereof, to better simulate the actual radio environment experienced by the receiver.

According to yet another preferred embodiment of this aspect of the invention, the at least one test processing unit is configured to simulate specific receiver operations such as: cold start, warm start, hot start, assisted start and/or factory reset. Hence, critical aspects of the design can be examined thoroughly.

According to a further preferred embodiment of this aspect of the invention, the at least one test processing unit is configured to simulate execution of the software on at least two different hardware platforms. This is advantageous because thereby any variations in the receiver performance due to the limitations of a given platform can become apparent. The arrangement may include first and second test processing units. The first test processing unit here represents a first hardware platform and the second test processing unit represents a second hardware platform. The first test processing unit is configured to execute the software in respect of the source file and thus produce a first result file, and analogously, the second test processing unit is configured to execute the software in respect of the source file and thus produce a second result file. Hence, the characteristics of different platforms can be studied in a straightforward manner.

According to still another preferred embodiment of this aspect of the invention, the arrangement includes a secondary data storage configured to store the at least one result file. The primary and secondary data storages are included in a common storage unit, e.g. a hard drive. Thereby, a conventional computer can be used to implement essential parts of the proposed arrangement.

According to another aspect of the invention, the object is achieved by the method described initially, wherein the GNSS receiver design to be tested includes software configured to generate position/time related data based on the raw digital data when the software is executed in a processing unit. The method further involves reading the source file from the primary data storage, and processing the source file by means of the software to generate at least one set of position/time related data. Each of the at least one set of position/time related data is stored to a respective result file. Each result file is then evaluated against reference data. The advantages of this method, as well as the preferred embodiments thereof, are apparent from the discussion above with reference to the proposed receiver.

According to a further aspect of the invention the object is achieved by a computer program, which is directly loadable into the memory of a computer, and includes software adapted to implement the method proposed above when said program is run on a computer.

According to another aspect of the invention the object is achieved by a computer readable medium, having a program recorded thereon, where the program is to control a computer to perform the method proposed above when the program is loaded into the computer.

Further advantages, beneficial features and applications of the present invention will be apparent from the following description and the dependent claims.

BRIEF DESCRIPTION OF THE DRAWINGS

The present invention is now to be explained more closely by means of preferred embodiments, which are disclosed as examples, and with reference to the attached drawings.

DESCRIPTION OF PREFERRED
EMBODIMENTS OF THE INVENTION

Figure 1:
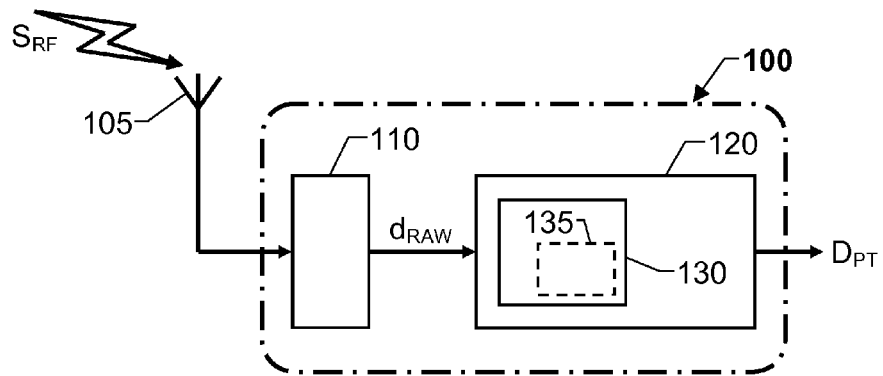
FIG. 1 shows a block diagram of a GNSS receiver the design of is to be evaluated.

We refer initially to FIG. 1, which shows a block diagram of a GNSS receiver 100 the design of which is to be evaluated. The receiver 100 includes a radio frequency input device 105 (such as an antenna unit), a radio-frequency front end 110 and a radio signal processing unit 120, which in turn, contains a processing unit 130.

The radio frequency input device 105 is configured to receive GNSS signals $S_{RF}$ and forward these signals to the radio-frequency front end 110. Based on the received GNSS signals $S_{RF}$, the radio-frequency front end 110 is configured to produce raw digital data $d_{RAW}$, which are fed to the radio signal processing unit 120. Software 135 is executed in the processing unit 130 in respect of the raw digital data $d_{RAW}$, and as a result, position/time related data $D_{PT}$ are generated.

Figure 2:
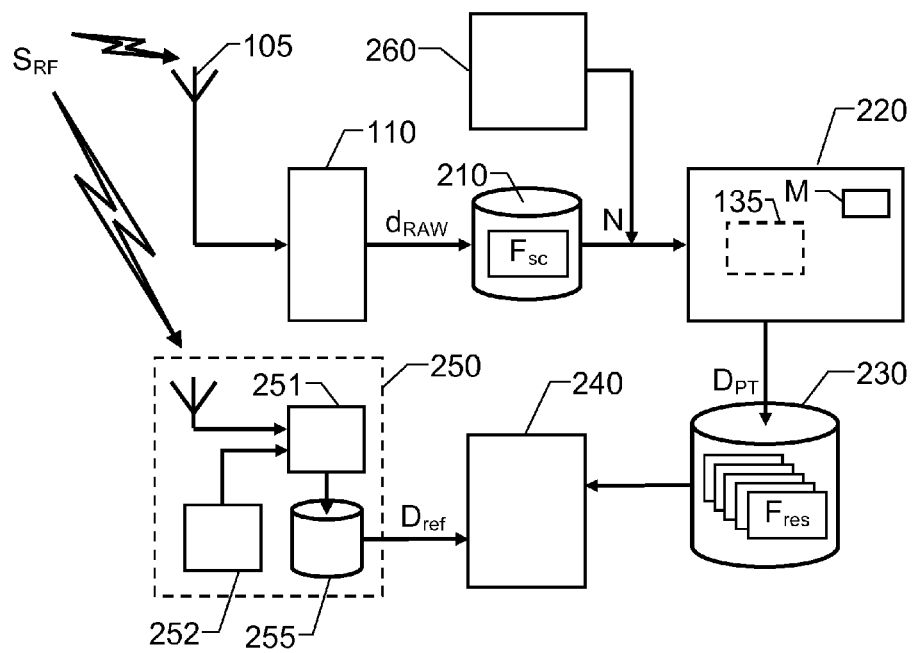
FIG. 2 shows a block diagram over one embodiment of an arrangement according to the invention.

In order to evaluate the performance of the software 135, and thus for example examine the quality of the navigation solution provided by the receiver 100, we will now explain the proposed test strategy with reference to FIG. 2, which shows a block diagram over one embodiment of the arrangement according to the invention.

The arrangement includes a radio-frequency front end 110, a primary data storage 210, a test processing unit 220, a secondary data storage 230 and assessing means 240.

The radio-frequency front end 110 is a representative example of the front end to be included in a receiver unit 100 built according to the design to be evaluated. Hence, the radio-frequency front end 110 is configured to receive radio signals $S_{RF}$, preferably from a radio frequency input device 105, and based thereon produce raw digital data $d_{RAW}$, e.g. containing IQ data (i.e. in- and quadrature phases of complex demodulated data).

The primary data storage 210 is configured to store raw digital data $d_{RAW}$ representing the GNSS signals $S_{RF}$ received by the radio-frequency front end 110 to a source file $F_{sc}$.

The above-mentioned software 135 is installed on the test processing unit 220. The test processing unit 220 is further configured to read the source file $F_{sc}$ from the primary data storage 210, process the source file $F_{sc}$ by means of the software 135 to generate at least one set of position/time related data $D_{PT}$, and then store each of the at least one set of position/time related data $D_{PT}$ to a respective result file $F_{res}$ in the secondary data storage 230. Consequently, the result file $F_{res}$ captures the essential physical features of the radio frequency chain (i.e. the radio frequency input device 105, the radio-frequency front end 110 and its down converter, filters etc.) as well as the signal environment in which the radio signals $S_{RF}$ were registered (i.e. including any fading, multipath transmission etc.).

According to one preferred embodiment of the invention, the primary and secondary data storages 210 and 230 respectively are included in a common storage unit, such as a magnetic recording medium, for example a floppy disc or hard drive. However, one or both of the primary and secondary data storages 210 and 230 may equally well be represented by a Flash memory, a ROM (Read Only Memory), a DVD (Digital Video/Versatile Disk), a CD (Compact Disc), an EPROM (Erasable Programmable Read-Only Memory) or an EEPROM (Electrically Erasable Programmable Read-Only Memory).

The assessing means 240 is configured to evaluate each of the result files $F_{res}$ against reference data $D_{ref}$. This evaluation may involve calculating a two-dimensional error between the result file $F_{res}$ and the reference data $D_{ref}$ at time-aligned points. Statistics like mean, 95th percentile and maximum errors may also be derived by the assessing means 240.

Many alternatives exist to generate the reference data $D_{ref}$. For example an inertial navigation system 250 may be moved along the route trajectory. The inertial navigation system 250, in turn, preferably includes a high-grade GPS receiver 251 and an IMU 252, which in combination produces reference data $D_{ref}$ that are stored in a storage 255, for instance including a hard drive.

Alternatively, the reference data $D_{ref}$ may be generated based on the result files $F_{res}$. Namely, by determining an average trajectory from a relatively large set of position/time related data $D_{PT}$ for the route trajectory represented by the multitude of result files $F_{res}$ a comparatively reliable reference can be obtained.

Preferably, the test processing unit 220 is configured to process the source file $F_{sc}$ in two or more processing runs of the software 135, where the processing is started at different offsets into the source file $F_{sc}$, and each processing run results in a respective result file $F_{res}$. The multiple processing runs are highly advantageous because the effects of very small offsets can be studied conveniently and efficiently. A typical case may include 256 runs, with offsets uniformly distributed between 0 and 1 second.

According to the invention, the number of runs is limited only by the computing resources available in the test processing unit 220. If necessary, and/or desirable, two or more processing units 220 can be employed. The at least one test processing unit 220 may further be configured to execute at least two processing runs in parallel with one another, or execute at least two processing runs in series after one another. Naturally, it is likewise possible to execute a first set of processing runs in parallel with one another and executing a second set of processing runs in series after one another. Moreover, the granularity of the offsets (i.e. the smallest meaningful offset) is limited only by the sampling rate used for the recording of the source file $F_{sc}$, for instance on the order of 1/2048 MHz≈500 nanoseconds. The resulting set of trajectories represented by the result files $F_{res}$ is essentially equivalent to having taken a number of identical receivers (say256, referring to the above typical case), connecting the receivers via a giant signal splitter to a single common antenna, starting all the receivers within one second (however not with perfect synchronization), and traversing the test route.

The large number of runs made possible via the invention dramatically increases the statistical significance/confidence of the quantitative results from the assessing means 240.

Furthermore, probability increases significantly that the uncommon (however by no means negligible) "corner cases" of the software 135 will be identified (e.g. situations in which unusually, and sometimes unacceptably, large navigation errors occur). Namely, such anomalies may only be reliably identified by far more testing than can be made using the known methods mentioned initially.

The proposed approach is also deterministic and fully repeatable. This means that if, in response to a particular artifact observed by the assessing means 240, a tuning improvement is made to the design, for example in the navigation filter, the effects of that change can be verified directly.

Additionally, the invention lends itself naturally to automated implementation. As a result, in practice, the testing coverage may be increased several orders of magnitude relative to the prior-art strategies.

Furthermore, only limited infrastructure is required, and the test processing unit(s) 220 may be represented by one or more conventional computers (e.g. PCs).

In addition thereto, when testing so-called assisted GNSS, the source file $F_{sc}$ is orthogonal to (in the sense of independent) the assistance information. Thus, for example, cold/warm/hot/assisted start performance can be tested with the same granularity as continuous navigation performance. This is also valid for a so-called factory reset operation.

Moreover, the invention allows enhanced evaluation of error models. This means that estimated measurement noise can be compared against true error. Error models can be evaluated with conventional testing as well. However, the replay enabled by the invention allows the same environment to be evaluated multiple times. Therefore, any filter tuning will be based on a large population of data rather than a single-shot test drive. To this aim, the arrangement preferably includes an interference generator 260 configured to add at least one interference signal N to the source file $F_{sc}$ before the at least one test processing unit 220 executes a given run of the software 135 in respect of the source file $F_{sc}$. The at least one interference signal N may include noise, which is produced according to a Gaussian noise model, or a filtered version thereof. In the latter case, it is advantageous if a filter is applied whose characteristics are similar to those of the radio frequency input device 105 and the radio-frequency front end 110.

Alternatively, or additionally, the interference signals N may include other type of signals, for instance narrowband (sinusoid) jammer signals, or other satellite signals to test resistance to spoofing and/or cross-correlation effects due to undesirable in-band energy According to one preferred embodiment of the invention, the at least one test processing unit 240 is configured to simulate execution of the software 135 on at least two different hardware platforms. Either such hardware platforms are simulated in software running on the test processing unit(s) 240, or one or more actual hardware platforms are used. For example, a first test processing unit may represent a first hardware platform, where the first test processing unit is configured to execute the software 135 in respect of the source file $F_{sc}$, and thus produce at least one first result file $F_{res}$. Analogously, a second test processing unit may represent a second hardware platform, and the second test processing unit is configured to execute the software 135 in respect of the source file $F_{sc}$, and thus produce at least one second result file $F_{res}$.

Figure 3:
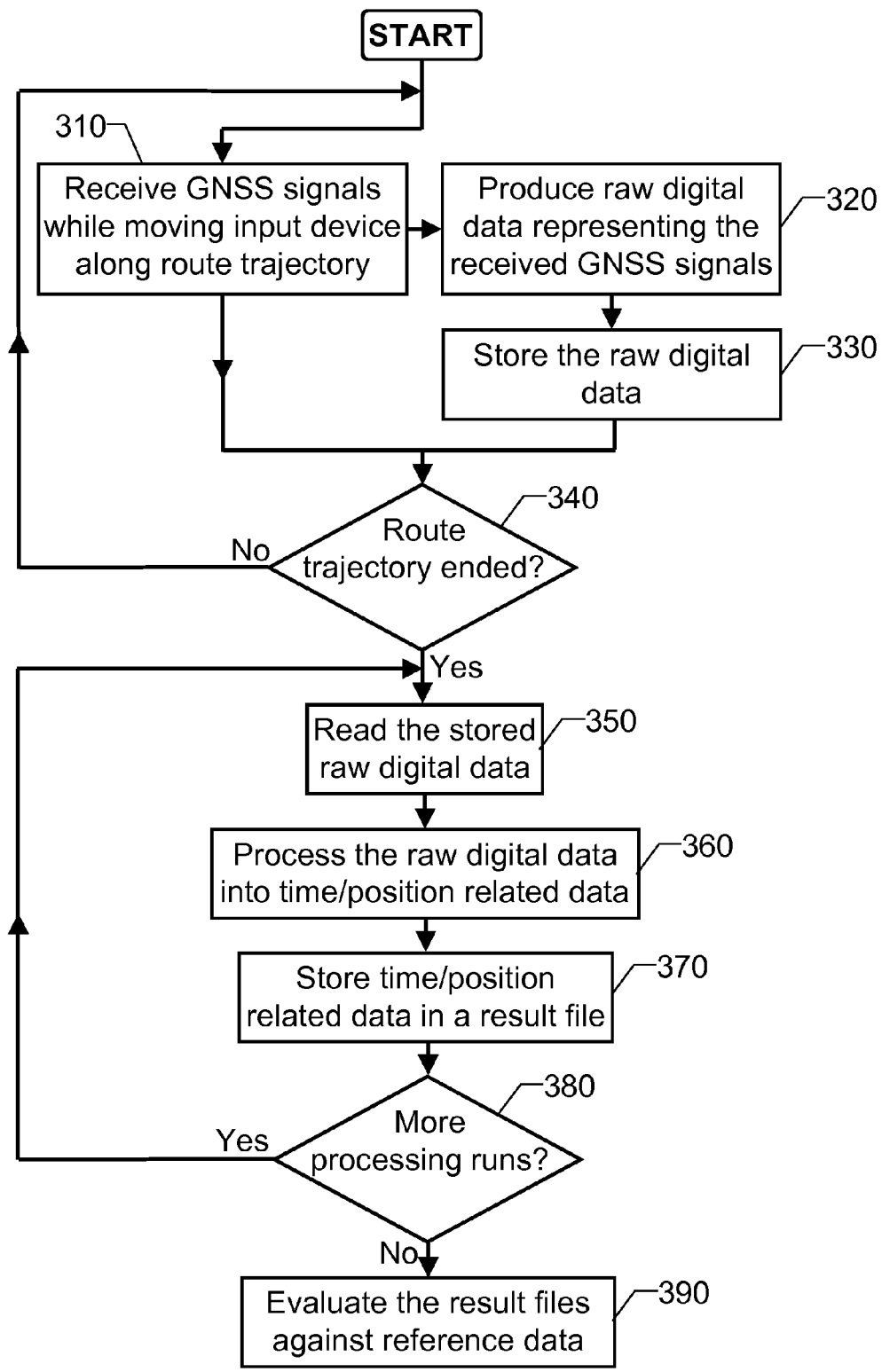
FIG. 3 illustrates, by means of a flow diagram, a general method of operating a test arrangement according to the invention.

To sum up, we will now describe a general method of controlling a test arrangement according to the invention with reference to the flow diagram in FIG. 3.

An initial step 310 receives GNSS signals $S_{RF}$ via a radio frequency input device 105 while moving the radio frequency input device 105 along a route trajectory. A step 320 then feeds the received GNSS signals $S_{RF}$ to a radio-frequency front end 110 of a representative example of a receiver unit 100 that is built according to the design to be tested. Preferably, the radio-frequency front end 110 thus receives the GNSS signals $S_{RF}$ online and in real time. However, according to the invention, is also possible that the radio frequency input device 105 instead is connected to an RF recorder/replayer, and that the radio-frequency front end 110 receives the GNSS signals $S_{RF}$ offline after having moved the radio frequency input device 105 and the RF recorder/replayer along the route trajectory. In any case, the radio-frequency front end 110 produces raw digital data $d_{RAW}$ based on the received GNSS signals $S_{RF}$. Thereafter, a step 330 stores the raw digital data $d_{RAW}$ in a primary data storage 210 as a source file $F_{sc}$.

Subsequently, a step 340 checks if the route trajectory has ended, or more precisely if there is more raw digital data $d_{RAW}$ to process. If this turns out to be the case, the process loops back to step 310 for continued updating of the raw digital data $d_{RAW}$ in the source file $F_{sc}$. Otherwise, a step 350 follows.

Step 350 reads the source file $F_{sc}$ from the primary data storage 210. Thereafter, a step 360 processes the source file $F_{sc}$ by means of software 135 executed in at least one test processing unit 220 to generate a set of position/time related data $D_{PT}$. Subquently, a step 370 stores the set of position/time related data $D_{PT}$ to a result file $F_{res}$.

Then, a step 380 checks if additional processing runs are to be executed in respect of the source file $F_{sc}$. If so, the process loops back to step 350. As mentioned above, in step 360 any subsequent processing run of the source file $F_{sc}$ preferably starts with an offset into the file being different from previous offsets. Hence, step 360 may also control this offset.

If step 380 finds that no more processing runs are to be executed, a step 390 evaluates the result files $F_{res}$ stored in step 370 against reference data $D_{ref}$.

All of the steps, as well as any sub-sequence of steps, described with reference to FIG. 3, above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the procedure according to the invention. The program may either be a part of an operating system, or be a separate application. The carrier may be any entity or device capable of carrying the program. For example, the carrier may comprise a storage medium, such as a Flash memory, a ROM, for example a DVD, a CD, an EPROM, an EEPROM, or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant procedures.

The term "comprises/comprising" when used in this specification is taken to specify the presence of stated features, integers, steps or components. However, the term does not preclude the presence or addition of one or more additional features, integers, steps or components or groups thereof.

The reference to any prior art in this specification is not, and should not be taken as, an acknowledgement or any suggestion that the referenced prior art forms part of the common general knowledge in Australia, or in any other country.

The invention is not restricted to the described embodiments in the figures, but may be varied freely within the scope of the claims.

The invention claimed is:

1. A system for testing a GNSS receiver design, the system comprising:
   a radio-frequency front end that is representative of a type of radio-frequency front end to be included in a receiver unit built according to the GNNSS receiver design to be tested, the radio-frequency front end being configured to receive radio signals and based thereon produce raw digital data (dRAW);
   a primary data storage configured to store the raw digital data (dRAW) representing GNSS signals (SRF) received by the radio-frequency front end as a source file (Fsc);
   software stored in a non-transitory storage medium, said software is associated with the GNSS receiver design to be tested and is configured to generate position/time related data (DPT) based on the raw digital data (dRAW) when the software is executed; and
   at least one test processing unit configured to:
   read the source file (Fsc) from the primary data storage, process the source file (Fsc) using the software to generate position/time related data (DPT), wherein the source file (Fsc) is processed in at least two processing runs of the software starting at different offsets from the beginning of the source file (Fsc), wherein the different offsets are uniformly distributed within a predetermined time period without synchronization to increase the statistical confidence of the generated position/time related data (DPT); store each processing run comprising the position/time related data (DPT) resulting from the processing run to a respective result file (Fres); and
   evaluate each of the result files (Fres) against reference data (Dref).

2. The system according to claim 1, wherein the at least one test processing unit is configured to execute the at least two processing runs in parallel with one another.

3. The system according to claim 1, wherein the at least one test processing unit is configured to execute the at least two processing runs in series after one another.

4. The system according to claim 1, comprising an interference generator configured to add at least one interference signal (N) to the source file (Fsc) before the at least one test processing unit executes a given run of the software in respect of the source file (Fsc).

5. The system according to claim 4, wherein the interference generator is configured to produce noise to be included in the at least one interference signal (N), the noise being produced according to a Gaussian noise model, or a filtered version thereof.

6. The system according to claim 1, wherein the at least one test processing unit is configured to simulate at least one of the following operations in respect of a receiver unit built according to the design to be tested: cold start, warm start, hot start, assisted start and factory reset.

7. The system according to claim 1, wherein the at least one test processing unit is configured to simulate execution of the software on at least two different hardware platforms.

8. The system according to claim 7, comprising first and second test processing units, wherein:
   the first test processing unit represents a first hardware platform, the first test processing unit being configured to execute the software in respect of the source file (Fsc) and thus produce a first result file (Fres); and
   the second test processing unit represents a second hardware platform, the second test processing unit being configured to execute the software in respect of the source file (Fsc) and thus produce a second result file (Fres).

9. The system according to claim 1, comprising a secondary data storage configured to store the result file (Fres), the primary and secondary data storages being included in a common storage unit.

10. A method of evaluating a GNSS receiver design, the method comprising:
receiving GNSS signals (SRF) via a radio frequency input device while moving the radio frequency input device along a route trajectory;
feeding the received GNSS signals (SRF) to a radio-frequency front end that is representative of a receiver unit built according to the GNSS receiver design being evaluated;
producing, via the radio-frequency front end, raw digital data (dRAW) representing the received GNSS signals (SRF);
storing the raw digital data (dRAW) in a primary data storage as a source file (Fsc);
executing software associated with the GNSS receiver design being evaluated, wherein the software is configured to generate position/time related data (DPT) based on the raw digital data (dRAW), said executing comprising:
reading the source file (Fsc) from the primary data storage;
processing the source file (Fsc) by means of the software to generate position/time related data (DPT), wherein the processing the source files (Fsc) comprises executing at least two processing runs of the software starting at different offsets into the source file (Fsc), wherein the different offsets are uniformly distributed within a predetermined time period without synchronization to increase the statistical confidence of the generated position/time related data (DPT);
storing each processing run comprising the position/time related data (DPT) resulting from the processing run to a respective result file (Fres); and
evaluating each of the result files (Fres) against reference data (Dref).

11. The method according to claim 10, comprising executing at least two of the least two processing runs of the software in parallel with one another.

12. The method according to claim 10, comprising executing at least two of the least two processing runs in series after one another.

13. The method according to claim 10, comprising adding at least one interference signal (N) to the source file (Fsc) before executing a given run of the software.

14. The method according to claim 13, wherein at least one of the at least one interference signal (N) comprises noise produced according to a Gaussian noise model, or a filtered version thereof.

15. The method according to claim 10, wherein the method comprises simulating at least one of the following operations in respect of a receiver unit built according to the design to be tested: cold start, warm start, hot start, assisted start and factory reset.

16. The method according to claim 10, wherein the method comprises simulating execution of the software on at least two different hardware platforms.

17. The method according to claim 10, wherein the method comprises generating the reference data (Dref) by moving an inertial navigation system along the route trajectory.

18. The method according to claim 10, wherein the method comprises generating the reference data (Dref) by determining an average trajectory based on multiple sets of position/time related data (DPT) for the route trajectory as are represented in the result files (Fres).

19. A computer program product for evaluating a GNSS receiver design, the computer program product comprising at least one non-transitory computer-readable medium having computer-readable program code portions embodied therein, the computer-readable program code portions comprising executable portions for controlling:
receiving GNSS signals (SRF) via a radio frequency input device while moving the radio frequency input device along a route trajectory;
feeding the received GNSS signals (SRF) to a radio-frequency front end that is representative of a receiver unit built according to the GNSS receiver design being evaluated;
producing, via the radio-frequency front end, raw digital data (dRAW) representing the received GNSS signals (SRF);
storing the raw digital data (dRAW) in a primary data storage as a source file (Fsc);
executing software associated with the GNSS receiver design being evaluated, wherein the software is configured to generate position/time related data (DPT) based on the raw digital data (dRAW) said executing comprising:
reading the source file (Fsc) from the primary data storage;
processing the source file (Fsc) by means of the software to generate position/time related data (DPT), wherein the processing the source files (Fsc) comprises executing at least two processing runs of the software starting at different offsets into the source file (Fsc), wherein the different offsets are uniformly distributed within a predetermined time period without synchronization to increase the statistical confidence of the generated position/time related data (DPT), each processing run resulting in a separate result file (Fres);
storing each processing run comprising the position/time related data (DPT) resulting from the processing run to a respective result file (Fres); and
evaluating each of the result files (Fres) against reference data (Dref).

20. The computer program product according to claim 19, wherein the predetermined time period is one second.

* * * * *